April 7, 1970  C. D. FLOWERS ET AL  3,505,170
FUEL SUBASSEMBLY FOR A LIQUID-METAL-COOLED FAST REACTOR
Filed April 10, 1968  5 Sheets-Sheet 1
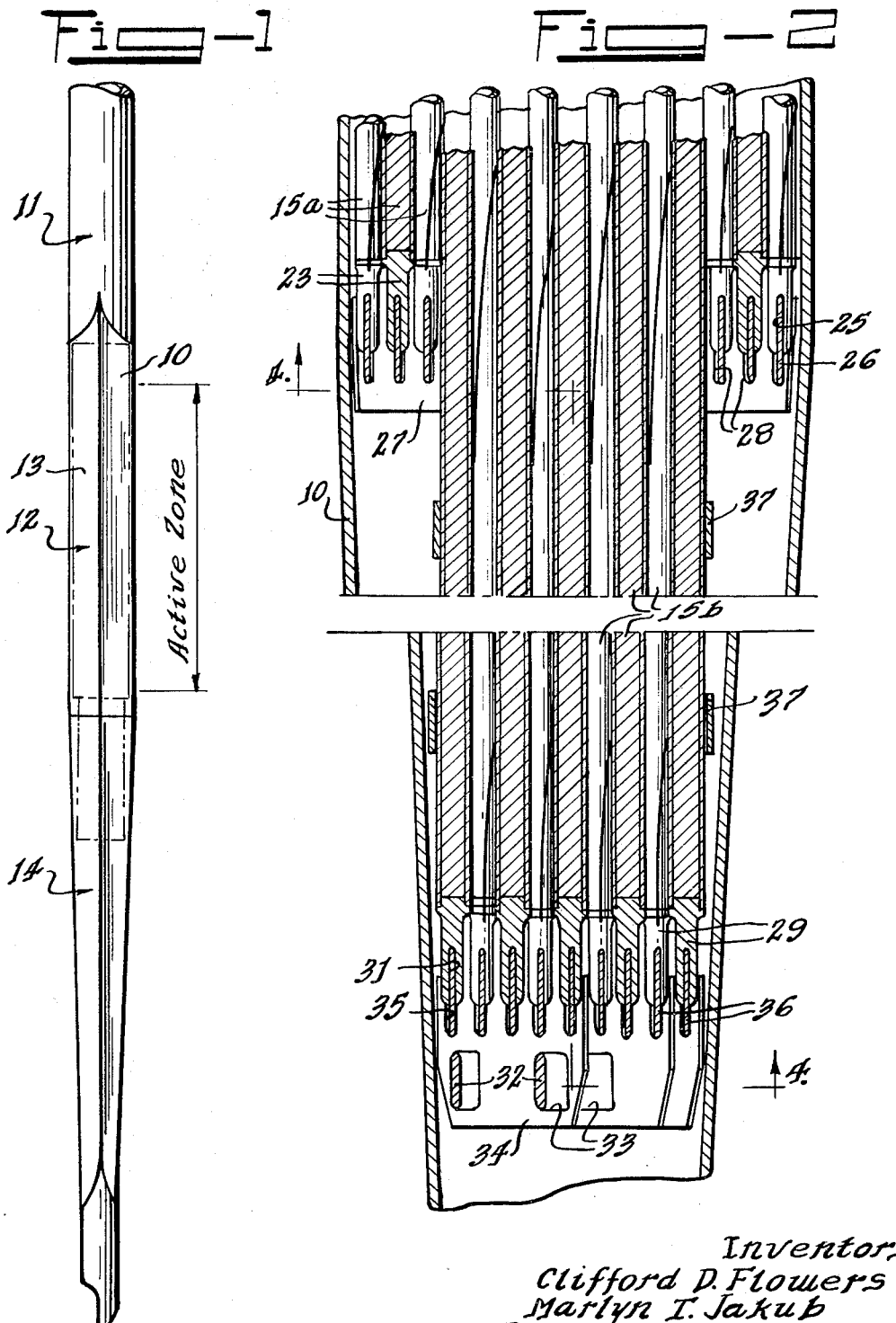
Inventors
Clifford D. Flowers
Marlyn I. Jakub
By:
Attorney

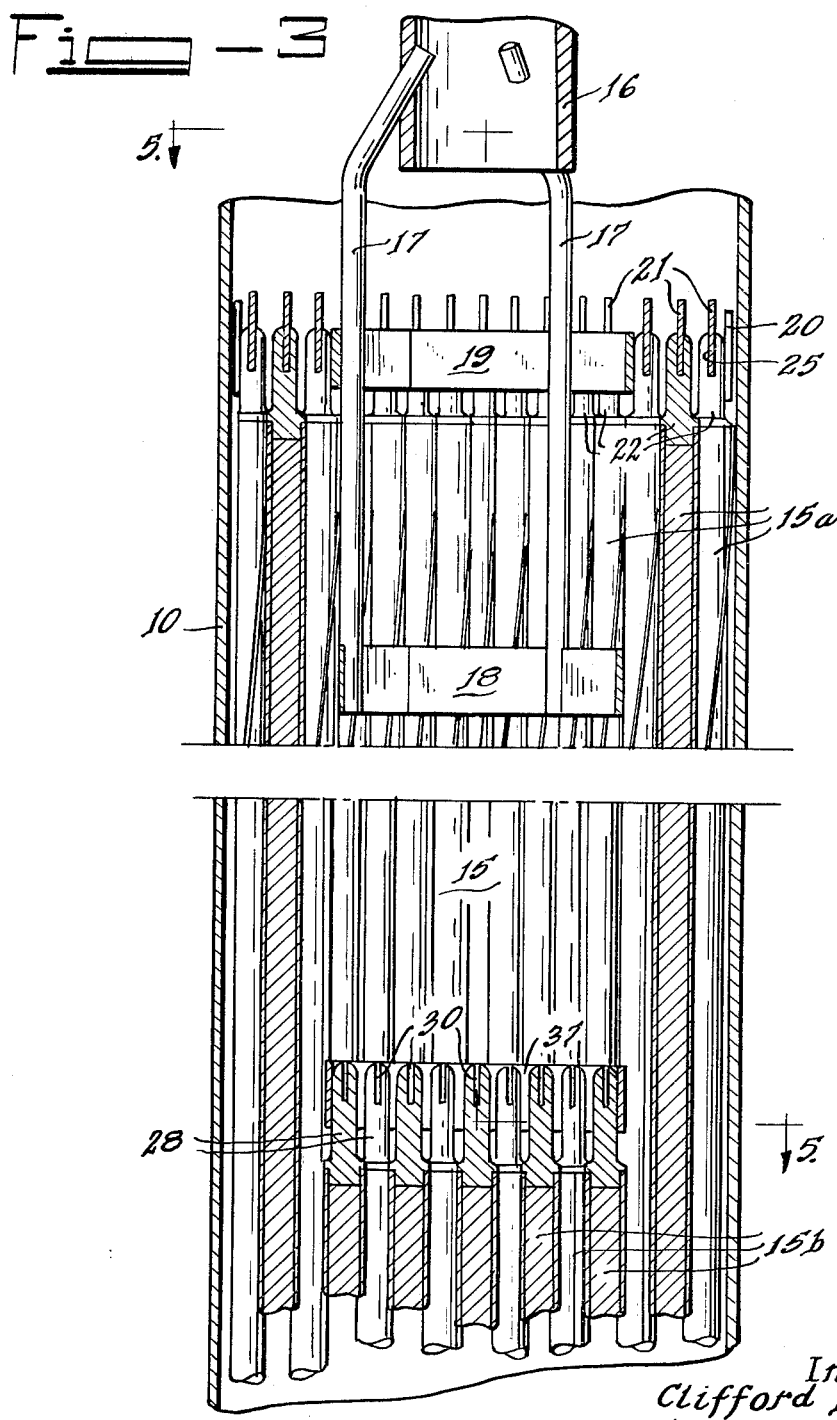

Inventors
Clifford D Flowers
Marlyn I Jakub
By:
[signature]
Attorney

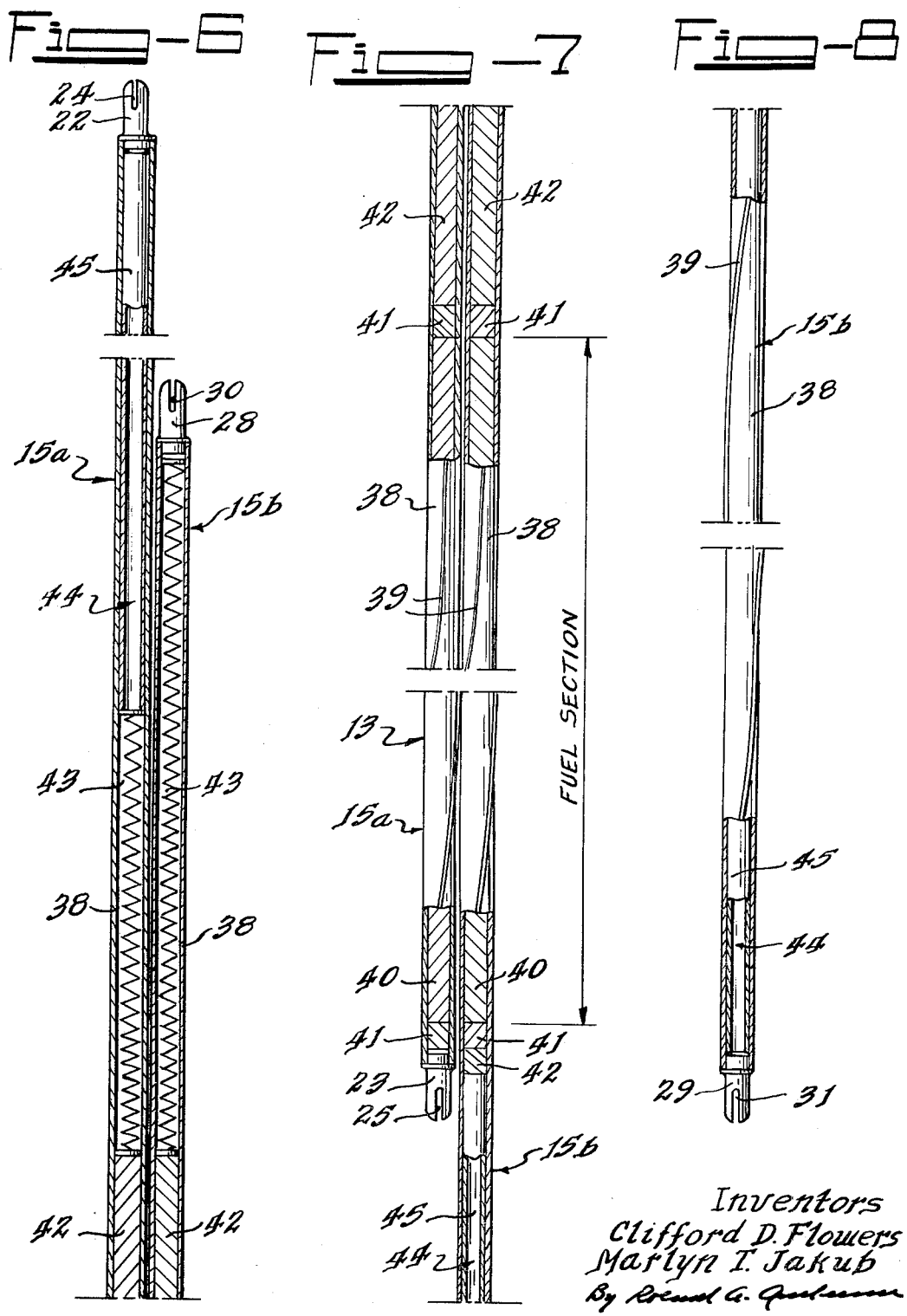

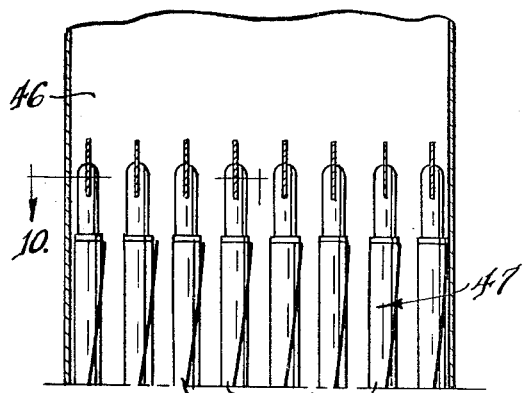
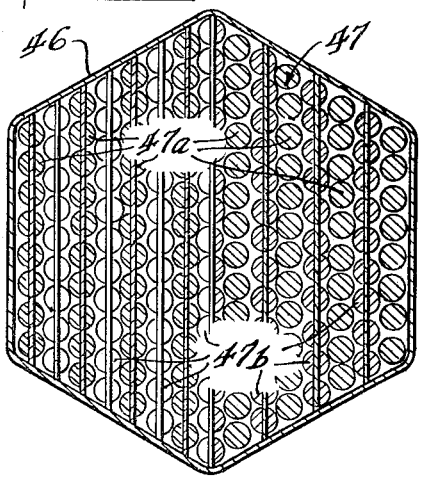
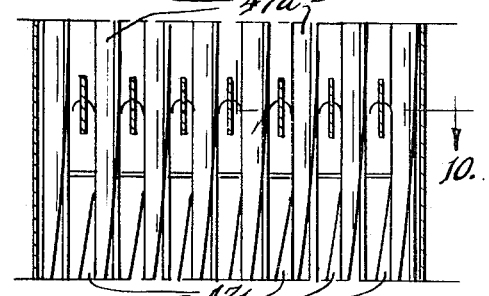
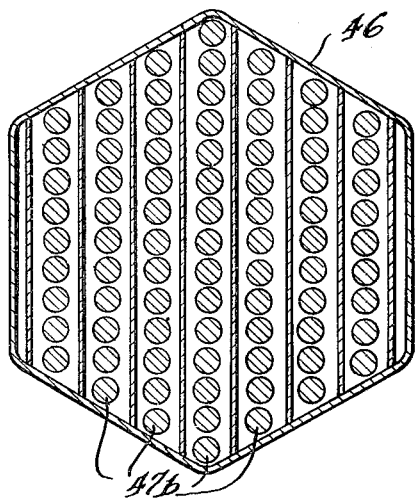
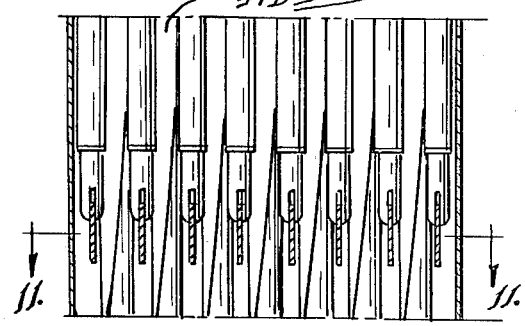
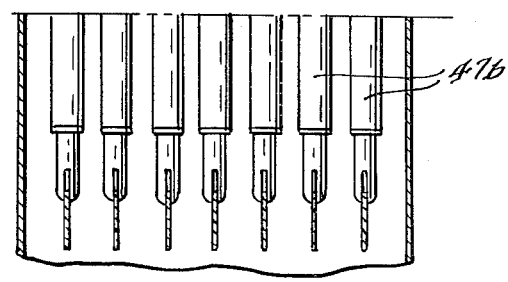
Inventors
Clifford D. Flowers
Marlyn T. Jakub United States Patent Office 3,505,170
Patented Apr. 7, 1970

3,505,170
FUEL SUBASSEMBLY FOR A LIQUID-METAL-COOLED FAST REACTOR
Clifford D. Flowers and Marlyn T. Jakub, Richland, Wash., assignors to the United States of America as represented by the United States Atomic Energy Commission
Filed Apr. 10, 1968, Ser. No. 720,198
Int. Cl. G21c 3/30, 3/32
U.S. Cl. 176—78     3 Claims

ABSTRACT OF THE DISCLOSURE

A fuel subassembly for a liquid-metal-cooled nuclear reactor operating predominantly on fast neutrons includes a plurality of fuel pins disposed within a shroud. Each of the fuel pins includes an active zone and a fission-gas plenum with the active zones of all fuel pins being disposed side by side while some of the fission-gas plenums are disposed upstream of the active zones, and the remainder are disposed downstream of the active zones.

CONTRACTUAL ORIGIN OF THE INVENTION

The invention described herein was made in the course of, or under, a contract with the United States Atomic Energy Commission.

BACKGROUND OF THE INVENTION

This invention relates to a fuel subassembly for a liquid-metal-cooled reactor which operates predominantly on fast neutrons. In more detail the invention relates to a fast reactor fuel subassembly designed to provide minimum resistance to the flow of liquid metal coolant therethrough.

Fuel subassemblies for liquid-metal-cooled fast reactors conventionally consist of a compact bundle of elongated small-diameter fuel pins enclosed within a shroud. For a large fast reactor such as the Fast Flux Test Facility— described in reports No. BNWL–501 and BNWL–SA–978, available from the Clearinghouse for Federal Scientific and Technical Information, U.S. Dept. of Commerce, Springfield, Va., and in the patent application of Deslonde R. de Boisblanc Ser. No. 718,685, filed April 4, 1968— the fuel pins must be very long to accommodate nuclear fuel, neutron reflector or blanket material and a plenum which serves as an accumulation reservoir for fission gases evolved in the fuel. In fact, service conditions contemplated in the design of fast reactor fuels (e.g. exposures up to 100,000 m.w.d./ton) may result in fuel pin lengths up to 15 feet. long. It is apparent that a compact bundle of long fuel pins creates a high flow resistance to coolant which causes a very high coolant pressure drop through the bundle. Not only do these conditions dictate the use of piping capable of withstanding the resulting high stresses, but requirements for pumps may transcend the limits of present technology.

A substantial proportion of the total length of a fuel pin designed for high burnups will consist of the fission-gas plenum. For the Fast Flux Test Facility the gas plenum is ⅔ as long as the total length of the fuel region.

It is accordingly the object of the present invention to develop a fuel subassembly for a fast reactor in which resistance to coolant flow is minimized while retaining a compact fuel bundle.

SUMMARY OF THE INVENTION

This and other objects of the present invention are attained by a fuel subassembly in which the fuel pins are so oriented that some of the fission-gas plenums extend upstream of the fuel and the remaining fission-gas plenums extend upstream of the fuel and the remaining fission-gas plenums extend downstream of the fuel. The invention may also be described as involving a fuel subassembly for a liquid-metal-cooled nuclear reactor which operates predominantly on fast neutrons comprising a shroud containing a bundle of slender, elongated, parallel fuel pins, each of which includes an active zone and a fission-gas plenum, the ends of the active zones of all of said fuel pins lying in parallel planes perpendicular to the axis of the subassembly, the fuel pins being so oriented that a portion of the fission-gas plenums are located downstream of the active zones and the remainder are located upstream of the active zones. As applied to the Fast Flux Test Reactor, a group of fuel pins at the center of the fuel subassembly have their gas plenums below the fuel (upstream of the fuel) while the remaining fuel pins have their gas plenums above the fuel (downstream of the fuel). In accordance with this embodiment of the reactor, therefore, the fuel pins at the center of the fuel subassembly extend below the outer fuel pins and the outer fuel pins extend above the fuel pins at the center of the fuel subassembly. Other arrangements are possible and these arrangements will be described hereinafter.

BRIEF DESCRIPTION OF THE DRAWING

The invention will next be described in connection with the accompanying drawing wherein:
FIG. 1 is a vertical elevation of a fuel subassembly for a nuclear reactor,
FIG. 2 is a vertical section of a lower portion of said fuel subassembly,
FIG. 3 is a vertical section of an upper portion of said fuel subassembly,
FIG. 6 is a vertical section of the upper portion of two adjacent, different fuel pins,
FIG. 7 is a vertical section of the middle portion of said fuel pins,
FIG. 8 is a vertical section of the lower portion thereof,
FIG. 9 is a vertical section of an alternative embodiment,
FIG. 10 is a horizontal section taken on line 10—10 of FIG. 9,
and
FIG. 11 is a horizontal section taken on line 11—11 of FIG. 9.

DESCRIPTION OF THE PREFERRED EMBODIMENT

Figure 5:
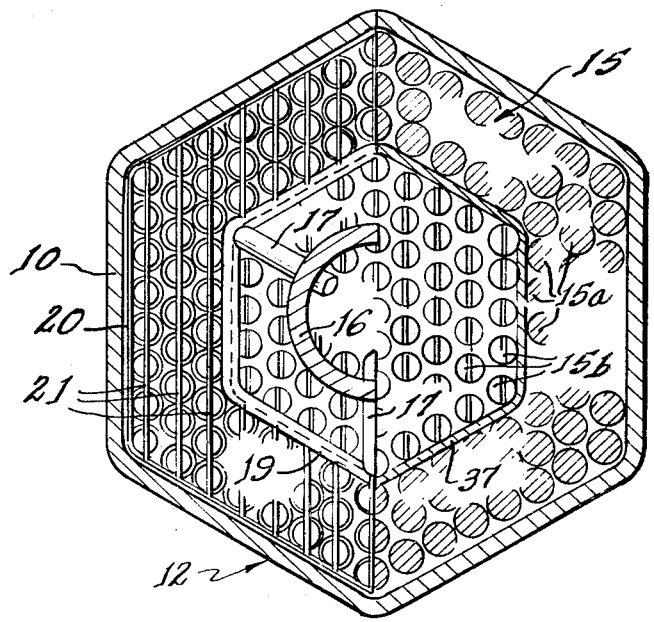
FIG. 5 is a horizontal section taken on lines 5—5 in FIG. 3.

As shown in FIG. 1, the fuel subassembly includes a shroud 10 defining an upper circular cylindrical portion 11, an intermediate hexagonal portion 12 of uniform cross section containing an active zone 13, and a lowered tapered portion 14. Coolant enters shroud 10 at the bottom, flows upwardly through active zone 13, and leaves shroud 10 at the top. The fuel subassembly of this embodiment is designed for use in the Fast Flux Test Reactor.

Figure 4:
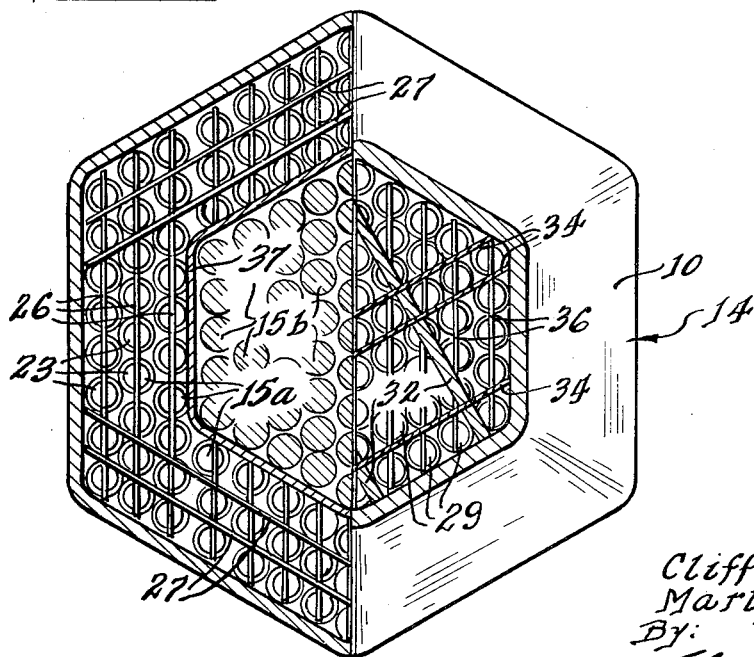
FIG. 4 is a horizontal section taken on lines 4—4 in FIG. 2.

Referring next to FIGS. 2 to 5, shroud 10 contains a bundle of fuel pins 15 arranged in triangular array. All of the fuel pins are of the same length but outer fuel pins 15a extend upwardly a substantial distance above inner fuel pins 15b and the inner fuel pins extend downwardly a substantial distance below the outer fuel pins. To make this arrangement possible, fuel pins 15a and fuel pins 15b differ in construction and particulars thereof will be given hereinafter in this specification.

Outer fuel pins 15a are supported from above by hanger tube 16 to which three equispaced support rods 17 are welded. Support rods 17 extend downwardly into the opening at the center of outer fuel pins 15a and are connected at their lower extremity by a hexagonal restraining band 18. Support rods 17 are welded to a hexagonal support band 19 which is disposed at the top of outer fuel pins 15 at the inner periphery of the annulus formed by the fuel pins. A hexagonal restraining band 20 is disposed around the outer periphery of these fuel pins and a plurality of equispaced parallel support strips 21 extend between support band 19 and restraining band 20 and are welded thereto. Support strips 21 are all parallel to opposite sides of shroud 10 but are not attached thereto.

Fuel pins 15a are provided with upper and lower end fittings 22 and 23 containing vertical slots 24 and 25, respectively. Fuel pins 15a are supported and restrained at the top by parallel support strips 21 which are engaged by slots 24 in upper end fittings 22 and are welded thereto, and at the bottom by spacing strips 26 which are engaged by slots 25 in lower end fittings 23. A plurality of strips 27 having slots 28 therein engage spacing strips 26 to lock the spacing strips in place.

Inner fuel pins 15b are provided with upper and lower end fittings 28 and 29 containing slots 30 and 31, respectively. No spacing or locking strips are necessary at the top of the inner fuel pins 15b, since these pins are confined within outer fuel pins 15a and supported from below.

Two support bars 32 extending across the fuel subassembly between flats of shroud 10 and penetrating openings in the walls of shroud 10 serve to support inner fuel pins 15b. Support bars 32 pass at right angles through closed slots 33 in four adapter plates 34 which also contain a plurality of slots 35 at the top thereof. A plurality of spacing strips 36 are engaged by slots 35 in locking plates 34 and by slots 31 in lower end fittings 29 of inner fuel pins 15b and are welded to lower end fittings 29.

It will be at once apparent that the arrangement described not only supports the fuel pins 15 but also positively establishes their location within the fuel subassembly. As a strengthening means, additional retaining bands 37 are provided at several locations surrounding inner fuel pins 15b.

Fuel pins 15a and 15b will next be described with particular reference to FIGS. 6, 7 and 8 of the drawing. As shown, both outer fuel pins 15a and inner fuel pins 15b include a tube 38, provided with a spiral rib 39 on the exterior thereof, enclosing a plurality of pellets 40 formed of a mixture of plutonium dioxide and uranium dioxide which make up active zone 13. Pellets 41 formed of depleted uranium dioxide are disposed above and below active zone 13 to serve as an axial blanket while nickel rods 42 are disposed thereabove to serve as axial reflector. Also springs 43 are disposed above rods 42. To the extent thus far described, fuel pins 15a and 15b are identical. The fuel pins differ only in the location of the fission-gas plenums 44 which are formed by stainless steel tubes 45. In outer fuel pins 15a the fission-gas plenums 44 are disposed above active zone 13 between springs 43 and upper end fittings 22, while in inner fuel pins 15b the fission-gas plenums 44 are disposed below active zone 13 between pellets 41 and lower end fitting 29. As is evident from the drawing, this arrangement makes it possible to locate the active zones 13 of all fuel pins side by side at the same elevation in the fuel subassembly to provide a compact core while providing minimum resistance to the flow of coolant therethrough.

A fuel pin designed specifically for use in the Fast Flux Test Reactor is 74.25 inches long and 0.25 inch O.D., the active zone is 36.75 inches long and the fission-gas plenum is 23.95 inches long. The fuel subassembly contains 169 fuel pins arranged on a triangular lattice of which the outer three rows have their gas plenums located above the fuel and the remainder have their gas plenums located below the fuel. Width of the fuel subassembly across flats is 3.740 inches and the length of the fuel subassembly between the bottom of the central fuel pins and the top of the outer fuel pins is 100.062 inches.

The specific embodiment of the invention described thus far was designed specifically for use in the Fast Flux Test Reactor. The design of this reactor requires that the lower portion of each fuel subassembly be tapered. Because of this taper, fuel pins in the outer few rows of the fuel bundle cannot extend a substantial distance below the fuel zones. Thus the advantages of the present invention are attained by so orienting the fuel pins that the pins at the center of the fuel pins extend a substantial distance below the active zones and the remaining fuel pins extend above the active zones.

If the design of the reactor is such that the fuel subassemblies are not tapered, many other embodiments are possible. For example, the gas plenums can be alternated so that even flow distribution can be obtained within the pin bundle. A second embodiment of the invention illustrating such an arrangement is disclosed in FIGS. 9 to 11; other embodiments are, of course, also possible.

Referring now to FIGS. 9 to 11, shroud 46 contains a plurality of fuel pins 47 arranged in triangular array. As in the first embodiment, all of the fuel pins are of the same length. According to this embodiment, alternate rows of fuel pins 47a extend upwardly a substantial distance above (downstream of) the remaining fuel pins 47b and the rows of fuel pins 47b extend downwardly a substantial distance below (upstream of) the first-mentioned rows of fuel pins. This arrangement lends itself readily to support within the shroud, which support is only sketchily indicated. As before, the gas plenums (not shown) are oriented above or below the active zones, depending on orientation of the fuel pin, with the fuel zones being side by side.

BASIS FOR PRESSURE DROP REDUCTION

The main reason for the reduction in pressure drop is the fact that the flow area in the gas plenum region is increased significantly. The pressure drop through the bundle (for a given flow) can be expressed as follows: (Since the pressure drop through the fuel zone is unchanged, only the gas plenum region is considered.)

$$\Delta p = K \left[ \frac{LP}{A_3} \right] \quad (1)$$

$$\left( \text{Derived from } \Delta p = 4f \frac{\rho V^2}{2g} \frac{L}{D_H} \right)$$

where $K = \frac{4fw^2}{2g\rho}$ = constant for highly turbulent flow $f$ = friction factor; $w$ = flow; $g$ = gravity constant; $\rho$ = density.
L = total gas plenum length.
P = wetted perimeter for coolant in gas plenum region.
A = coolant cross-sectional flow area in gas plenum region.

By employing the opposite-end gas plenum arrangement, the length, L, is increased; the wetted perimeter, P, is decreased; and the flow area, A, is increased. From Equation 1 it is evident that the flow area term will have the greatest effect on the pressure loss reduction.

The following examples illustrate the pressure drop reduction obtained by two different pin bundles employing the proposed arrangement.

EXAMPLE

Assume a 3.9-inch, across-the-flats, hexagonal flow region with highly turbulent sodium coolant and circular fuel pins.

Total area of hexagonal cross section = $\sqrt{\frac{3}{2}} (3.2)^2 =$ 13.18 in.² (100%)

Assume 169 circular pins with 0.25-inch O.D. and a wire wrap on each pin in order to space the pins 0.040-inch apart.

For a standard arrangement, where the gas plenums are on the same end, assume that the pressure drop is 17 p.s.i. per foot of length.

$P_s = 132.6 + 13.5 + 21.2 = 167.3$ inches.
$A_s = 100 - 63 - 1.6 = 35.4\%$.

For the fuel and axial reflector regions, which are assumed 4½ feet in length, the pressure drop is $$4.5(17) = 76.5 \text{ p.s.i.}$$

For the three-foot long fission-gas plenum, $$\Delta p_s = 17(3) = 51 \text{ p.s.i.}$$

Total pressure drop on a standard fuel subassembly = 76.5 + 51 = 127.5 p.s.i.

Case 1.—Evenly distributed arrangement of fission-gas plenum.

Assume that half of the pins are reversed in a pattern similar to those in FIGS. 9–11. The total length of the fission-gas plenum is doubled for the coolant—although it remains the same for each pin.

$$L_p = 2L_s$$

$$P_p = \frac{132.6 + 21.2}{2} + 13.5 = 90.4 \text{ inches}$$

$$A_p = 35.4 + \frac{63}{2} = 66.9\%$$

$$\frac{\Delta p_s}{\Delta p_p} = \frac{L_s}{L_p} \cdot \frac{p_s}{p_p} \left(\frac{A_p}{A_s}\right)^3 = \frac{1}{2} \cdot \left(\frac{66.9}{35.4}\right)^3 \cdot \frac{167.3}{90.4} = 6.25$$

$$\Delta p_p = \frac{\Delta p_s}{6.25} = \frac{51}{6.25} = 8.2 \text{ p.s.i.}$$

Total pressure drop = core loss + $\Delta p_p$ = 76.5 + 8.2 = 84.7 p.s.i.

Case 2.—More open arrangement gas plenums.

Assume that half of the pins are reversed in a pattern similar to those in FIGS. 2–8.

For the upper plenum region, assume that all of the flow is in the center and that the wetted perimeter (due to the remaining pins) is approximately 14 inches.

$$\frac{\Delta p_s}{\Delta p_p} = \frac{1}{1} \left(\frac{66.9}{35.4}\right)^3 \cdot \frac{167.3}{14} \simeq 80; \text{ thus, } \Delta p_p \simeq \frac{51}{80} \simeq 0.65 \text{ p.s.i.}$$

For the lower plenum region, the annulus is surrounded by the shroud tube wall and the pin cluster; thus $$P = 13.5 + (14) \simeq 27.5 \text{ inches.}$$

$$\frac{\Delta p_s}{\Delta p_p} = \frac{1}{1} \left(\frac{66.9}{35.4}\right)^3 \cdot \frac{167.3}{27.5} \simeq 40.7; \text{ thus, } \Delta p_p \simeq \frac{51}{40.7} \simeq 1.25 \text{ p.s.i.}$$

Total pressure drop = 76.5 + 0.65 + 1.25 ≃ 78.4 p.s.i.

CONCLUSIONS

The proposed fuel pin bundle arrangement results in a significant reduction in the coolant pressure drop through the pin bundle. Although the gas plenum length (L) becomes longer, the coolant flow area (A) in the plenum region is greatly increased, and the wetted perimeter (P) is decreased. This results in a significant reduction in pressure drop.

The sample calculations show that the pressure drop for the opposite-end gas plenum regions is approximately 85–95 percent less than the pressure drop for the gas plenums when all are located on the same end. Since the pressure drop through the active fuel region is unchanged, the over-all pressure drop of the entire bundle is decreased by approximately 30 to 40 percent by employing the proposed pin bundle arrangement. For high-exposure fuels, the fission-gas plenums may be two or three times longer than the core region; thus the over-all pressure reduction would approach 50 to 60 percent.

The embodiments of the invention in which an exclusive property or privilege is claimed are defined as follows:

1. A fuel subassembly for a liquid-metal-cooled nuclear reactor which operates predominantly on fast neutrons comprising a shroud containing a bundle of slender, elongated, parallel fuel pins, said shroud having an upstream portion for receiving the liquid metal, a downstream portion for discharging the liquid metal and an active zone intermediate said upstream and downstream portions, each of said fuel pins having an active zone end and a fission-gas plenum end, said active zone end of each of said fuel pins lying in parallel planes perpendicular to the axis of the subassembly, a first group of said fuel pins being so oriented that said active zone ends are located within said active zone of said shroud and said fission-gas plenum ends are located within said downstream portion of said shroud, and a second group of said fuel pins being so oriented that said active zone ends are located within said active zone of said shroud and said fission-gas plenum ends are located within said upstream portion of said shroud.

2. A fuel subassembly according to claim 1 in which the shroud tapers inwardly at one of said upstream end and said downstream end portions, one of said first and second groups of said fuel pins being located in the central portion of said shroud, the fuel pins of said one group further having said fission-gas plenum ends thereof extending within the tapered portion of said shroud, the other of said first and second groups of said fuel pins being positioned around said one group of said fuel pins with the fission-gas plenum ends of said other group of said fuel pins extending into the other of said upstream end and said downstream end portions of said shroud.

3. A fuel assembly according to claim 1 in which said first and second groups of fuel pins are each arranged in separate rows, said rows of said fuel pins of said first group alternating with said rows of said fuel pins of said second group, whereby alternate rows of fuel pins have their fission-gas plenums located on one side of said active zone of said shroud and the remaining rows of fuel pins have their fission-gas plenums located on the other side of said active zone of said shroud.

References Cited

UNITED STATES PATENTS

| | | | |
|---|---|---|---|
| 3,425,908 | 2/1969 | Rouge et al. | 176—78 |
| 3,378,458 | 4/1968 | Ross et al. | 176—68 |
| 3,274,067 | 9/1966 | Greebler et al. | 176—68 |
| 3,257,285 | 6/1966 | Clifford et al. | 176—68 |

CARL D. QUARFORTH, Primary Examiner

GARY G. SOLYST, Assistant Examiner

U.S. Cl. X.R.

176—68

UNITED STATES PATENT OFFICE
CERTIFICATE OF CORRECTION

Patent No. 3,505,170    Dated April 7, 1970

Inventor(s) Clifford D. Flowers and Marlyn T. Jakub

It is certified that error appears in the above-identified patent and that said Letters Patent are hereby corrected as shown below:

Column 2, lines 1 and 2, after the word "extend" omit "upstream of the fuel and the remaining fission-gas plenums extend".

Column 4, footnote (1), "$A_3$" should read --$A^3$--.

Column 5, line 3, after "apart." add the following:

--Total pin cross-sectional area = $169 \frac{\pi}{4} D^2$ = $169 \frac{\pi}{4} (0.25)^2$ = 8.30 in$^2$ (63%).

Total pin wetted perimeter = $169 \pi D$ = $169 \pi (0.25)$

= 132.6 inches.

Shroud wetted perimeter = 6(2.25)

= 13.5 inches.

Total wire wrap cross-sectional area = $169 \frac{\pi}{4} D^2$ = $169 \frac{\pi}{4} (0.040)^2$ = 0.212 in$^2$ (1.6%).

Total wire wrap wetted perimeter = $169 \pi D$ = $169 \pi (0.040)$

= 21.2 inches.--.

NOV. 3, 1970

(SEAL)
Attest:

Edward M. Fletcher, Jr.
Attesting Officer

WILLIAM E. SCHUYLER, JR.
Commissioner of Patents